(12) United States Patent
Takaoka et al.

(10) Patent No.: US 12,275,460 B2
(45) Date of Patent: Apr. 15, 2025

(54) SYSTEMS, ASSEMBLIES, AND METHODS FOR LOCKING CAB TO MAIN BODY OF WORK MACHINE

(71) Applicant: Caterpillar SARL, Geneva (CH)

(72) Inventors: Tetsuji Takaoka, Akashi (JP); Masaya Yorifuji, Akashi (JP); Tomohiro Fujii, Akashi (JP); Kimikage Tanaka, Akashi (JP); Kazumasa Matsumura, Akashi (JP); Takeshi Tsuneyoshi, Akashi (JP); Takayuki Naito, Akashi (JP); Tetsuo Nishiguchi, Akashi (JP); Kunitomo Shimizu, Akashi (JP); Eiji Akahane, Akashi (JP); Shuji Kidoguchi, Akashi (JP)

(73) Assignee: Caterpillar SARL, Geneva (CH)

( * ) Notice: Subject to any disclaimer, the term of this patent is extended or adjusted under 35 U.S.C. 154(b) by 869 days.

(21) Appl. No.: 17/472,708

(22) Filed: Sep. 13, 2021

(65) Prior Publication Data

US 2023/0081006 A1 Mar. 16, 2023

(51) Int. Cl.
*B62D 33/063* (2006.01)
*B60P 3/41* (2006.01)
*B62D 27/06* (2006.01)
*B62D 33/06* (2006.01)
*B62D 33/07* (2006.01)

(52) U.S. Cl.
CPC ............ *B62D 33/0633* (2013.01); *B60P 3/41* (2013.01); *B62D 27/065* (2013.01); *B62D 33/0617* (2013.01); *B62D 33/071* (2013.01)

(58) Field of Classification Search
CPC .............. B62D 33/0633; B62D 27/065; B62D 33/0617; B62D 33/071; B60P 3/41; E02F 9/163; E02B 9/166
See application file for complete search history.

(56) References Cited

U.S. PATENT DOCUMENTS

| 3,428,343 A | * | 2/1969 | Downie | ................ F16D 1/0882 403/358 |
| 3,797,882 A | * | 3/1974 | Brimhall | .............. B62D 33/071 296/35.1 |
| 3,930,681 A | * | 1/1976 | Burton | .................... F16B 2/185 296/35.1 |

(Continued)

FOREIGN PATENT DOCUMENTS

| CN | 101553629 A | * | 10/2009 | .............. E02F 9/166 |
| CN | 111074963 A | * | 4/2020 | |

(Continued)

*Primary Examiner* — Drew J Brown

(57) ABSTRACT

A work machine comprises a main body, a cab riser, and a shaft. The cab riser includes a cab and a frame, the cab being uprightly positioned on the work machine in a first position, and being tilted forward in a second position, and the frame comprising a first plate to contact a second plate provided on the main body in the first position. The cab riser is rotatable about the shaft in clockwise and counterclockwise directions to and from the first position and the second position. The first plate and the second plate can be clamped together by a clamping assembly in the first position, the clamping assembly including one or more clamps to clamp the first plate and the second plate, and the clamping assembly is mounted on the main body.

20 Claims, 12 Drawing Sheets

(56) References Cited

U.S. PATENT DOCUMENTS

| | | | | |
|---|---|---|---|---|
| 4,012,071 | A | * | 3/1977 | Jones ................. B62D 33/0604 296/35.1 |
| 4,053,178 | A | * | 10/1977 | York ....................... E02F 9/166 296/35.1 |
| 4,114,718 | A | * | 9/1978 | Lipshield ............. B62D 33/071 292/111 |
| 4,159,136 | A | * | 6/1979 | Kimball .................. E05B 51/02 292/111 |
| 5,784,813 | A | * | 7/1998 | Balassa ................. E02F 9/2825 37/457 |
| 5,918,694 | A | * | 7/1999 | Miller ................... E02F 9/2004 180/328 |
| 5,941,330 | A | * | 8/1999 | Miller .................... E02F 9/166 180/328 |
| 5,992,063 | A | * | 11/1999 | Mack ................... E02F 9/2833 37/456 |
| 7,950,729 | B2 | * | 5/2011 | Gerke ..................... B62D 65/04 296/193.07 |
| 8,393,097 | B2 | * | 3/2013 | Harder .................. E02F 9/2841 37/455 |
| 9,096,280 | B2 | | 8/2015 | Sintek et al. |
| 9,897,158 | B2 | * | 2/2018 | Ellen ........................ F16F 1/36 |
| 2002/0037211 | A1 | * | 3/2002 | Korycan ............... E02F 9/2275 414/501 |
| 2004/0182617 | A1 | * | 9/2004 | Sanderson ............. B62D 33/07 180/69.21 |
| 2013/0149095 | A1 | * | 6/2013 | Huissoon ................ E02F 3/325 180/53.1 |
| 2015/0115658 | A1 | * | 4/2015 | Sintek ................ B62D 33/0617 296/190.06 |
| 2017/0314229 | A1 | * | 11/2017 | Capraro .................... E02F 9/16 |
| 2018/0003254 | A1 | * | 1/2018 | Ellen ....................... E02F 9/166 |
| 2019/0071137 | A1 | * | 3/2019 | Venugopal ......... B62D 33/0617 |
| 2020/0317485 | A1 | * | 10/2020 | Confer ................ B66F 9/07531 |
| 2022/0325505 | A1 | * | 10/2022 | Johnston ............... E02F 9/2883 |

FOREIGN PATENT DOCUMENTS

| | | | | |
|---|---|---|---|---|
| CN | 111305307 | A | * | 6/2020 |
| CN | 115009381 | A | * | 9/2022 |
| DE | 112018001408 | T5 | * | 12/2019 ................ E02F 9/16 |
| EP | 3178999 | A1 | * | 6/2017 ............ E02F 9/0808 |
| GB | 2545184 | A | * | 6/2017 ............ E02F 9/0808 |
| JP | H09310375 | A | | 12/1997 |
| JP | 2022083274 | A | * | 6/2022 ........... B62D 33/067 |
| KR | 1998-020225 | U | | 7/1998 |
| KR | 20160052388 | A | * | 5/2016 |
| KR | 20160052395 | A | * | 5/2016 |
| KR | 20220082141 | A | * | 6/2022 |
| WO | WO-2016066179 | A1 | * | 5/2016 ......... B62D 33/0633 |
| WO | WO-2018188805 | A1 | * | 10/2018 ................ E02F 9/16 |

* cited by examiner

SYSTEMS, ASSEMBLIES, AND METHODS FOR LOCKING CAB TO MAIN BODY OF WORK MACHINE

TECHNICAL FIELD

The present disclosure relates to work machines, and more particularly to work machines having a cab and a cab riser which is tiltably coupled to a main body, and systems, assemblies, and methods thereof.

BACKGROUND

In work machines, such as forestry work machines, an operator's cab can be provided at a relatively high position in order to improve visibility of the work machines. On the other hand, when transporting the machine, for instance, on a transport trailer, it may be necessary to follow a transportation regulation and to prevent the operator's cab from exceeding the transportation regulation height. Thus, a cab riser can be provided to be tilted on the main body, forward around a shaft provided in front of the work machine. In an operation position, the cab riser and the cab can be raised upright by titling them backward, while the cab riser and the cab can be laid down by tilting them forward to the work machine in a transportation position.

For secure operation of the work machine, it may be desirable for the bottom of the rear end of the cab riser to be fastened to a connecting portion to the main body correctly and firmly in the operation position. However, large-scale equipment, tools, and maintenance environment are often not available after unloading the work machine from the transport trailer at a work site (e.g., in a forest). Therefore, easy transition of the work machine from the transportation position to the operation position may be desirable.

U.S. Pat. No. 9,096,280 ("the US '280 patent") describes a system and apparatus to fasten a cab and riser to a heavy machine in which the cab riser includes a frame that has therein a plurality of pivot pins coupled to clamping elements to fasten the cab and a riser to the heavy machine. According to the US '280 patent, by receiving a torque force to an activation screw coupled to each of the pivot pins from outside, such as a wrench or a screwdriver, the clamping elements of the riser may clampingly engage with a receiving structure of the heavy machine.

However, it has been desired to be able to fasten the cab riser to the main body of the work machine without separate special tools during the transition of the work machine from the transportation position to the operation position, to increase work efficiency.

SUMMARY

According to an aspect a work machine is described or provided. The work machine can comprise a main body, a cab riser, and a shaft. The cab riser can include a cab and a frame, the cab being uprightly positioned on the work machine in a first position, and being tilted forward in a second position, and the frame comprising a first plate to contact a second plate provided on the main body in the first position. The shaft can rotatably connect the cab riser to the main body, the cab riser being rotatable about the shaft in a clockwise direction and a counterclockwise direction to and from the first position and the second position. The first plate and the second plate can be clamped together by a clamping assembly in the first position, the clamping assembly including one or more C-shaped clamps to clamp the first plate and the second plate, and the clamping assembly can be mounted on the main body.

In another aspect, a work machine is disclosed or implemented. The work machine can comprise a cab riser, a main body and a shaft. The cab riser can include a cab and a frame, the cab being uprightly positioned on the work machine in a first position, and being tilted forward in a second position, and the frame comprising a support member to support the cab in the first position and a first plate which is connected to the support member in a horizontal direction. The main body can include a clamping assembly, the clamping assembly including a second plate and a clamping structure, the second plate being mounted on the main body at a predetermined height and arranged to be in parallel with the first plate in a vertical direction when the cab is in the first position, the clamping structure being movable linearly in a first direction and a second direction opposite the first direction. The shaft can rotatably connect the cab riser to the main body, the cab riser being rotatable about the shaft in a clockwise direction and a counterclockwise direction to and from the first position and the second position. The first plate of the cab riser and the second plate of the main body can be clamped together by the clamping structure in a case where the cab is in the first position, by directly engaging a lower surface of the first plate with an upper surface of the second plate, or indirectly engaging the lower surface of the first plate with the upper surface of the second plate by sandwiching another plate between the first plate and the second plate.

And in another aspect a method for a forestry work machine is disclosed or implemented. The method for the forestry work machine can comprise providing a main body; providing a cab riser including a cab and a frame, the cab being uprightly positioned on the forestry work machine in a first position, and being tilted forward in a second position, and the frame comprising a first plate to contact a second plate provided on the main body in a case where the cab is in the first position; providing a shaft that rotatably connects the cab riser to the main body, the cab riser being rotatable about the shaft in a clockwise direction and a counterclockwise direction to and from the first position and the second position; and clamping the first plate and the second plate together by a clamping assembly in the case where the cab is in the first position, the clamping assembly being mounted on the main body and including one or more C-shaped clamps to clamp the first plate and the second plate.

Other features and aspects of this disclosure will be apparent from the following description and the accompanying drawings.

DETAILED DESCRIPTION

The present disclosure relates to work machines, and more particularly to work machines, such as forestry work machines, having a cab and a cab riser which is tiltably coupled to a body, and systems, assemblies, and methods thereof. Generally, embodiments of the disclosed subject matter can implement a clamping assembly to fasten the cab riser to a main body of the work machine, where the clamping assembly can be mounted on the main body and equipped with a movable clamping structure to clamp a first plate, which can be a part of the cab riser, to a second plate, which can be a part of the main body.

Figure 1:
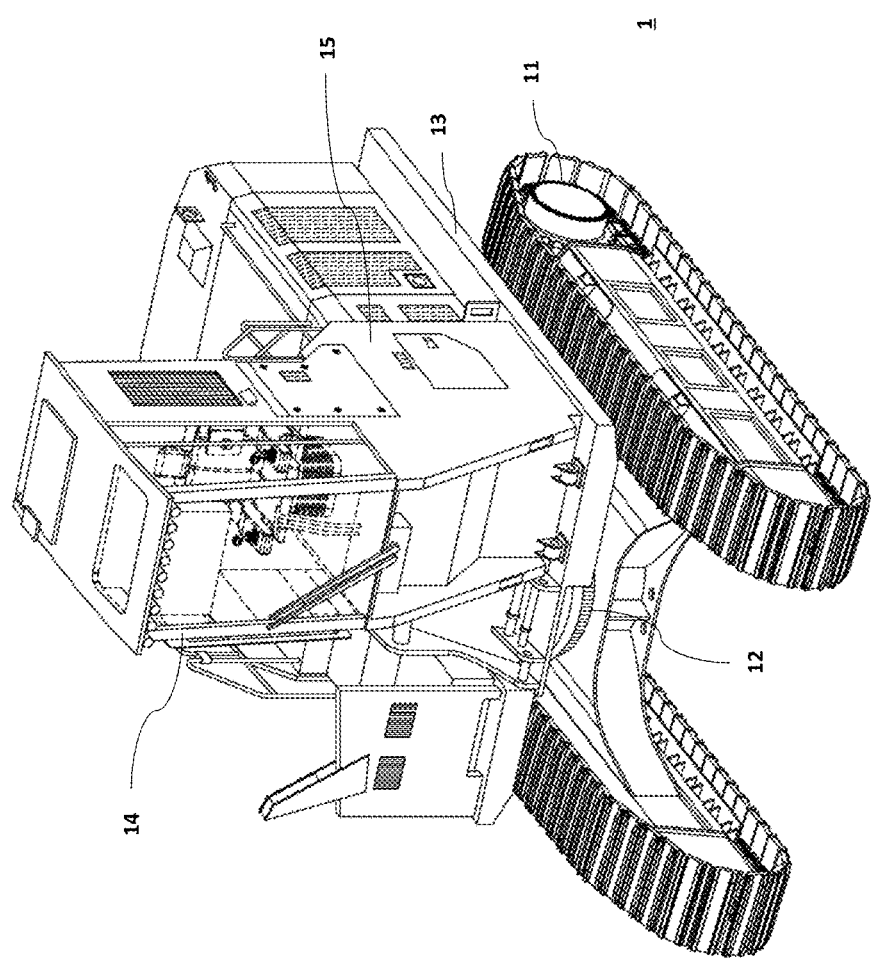
FIG. 1 is a perspective view of a forestry work machine as example of a work machine according to one or more embodiments of the disclosed subject matter.
Figure 2:
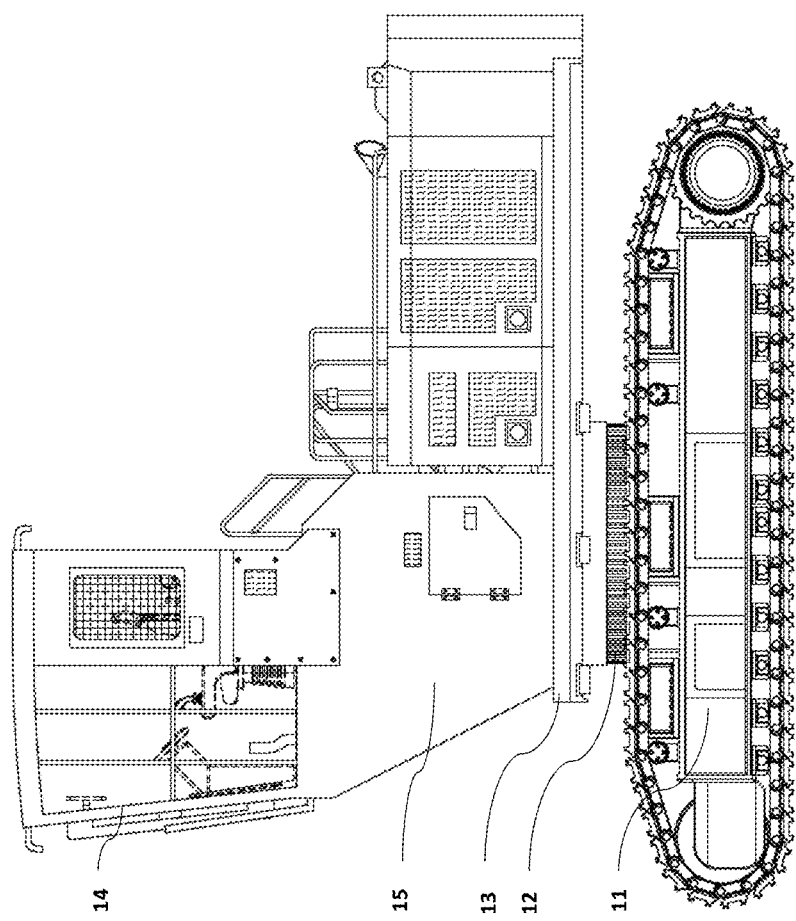
FIG. 2 is a side view of the work machine of FIG. 1.

Turning to the figures, FIG. 1 shows a perspective view of a forestry work machine as example of a work machine 1 according to one or more embodiments of the disclosed subject matter, though embodiments of the disclosed subject matter are not so limited. FIG. 2 shows a side view of the work machine 1 shown in FIG. 1.

Referring to FIG. 1 and FIG. 2, the work machine 1 can have a main body 13 and a lower traveling body 11. In the work machine 1, the main body 13 can be rotatably provided as a machine body on the lower traveling body 11 as an upper swing body, via a swing bearing portion 12. A cab 14 can be mounted on a cab riser 15 that serves as a base for mounting the cab 14 on one side of a front part of the main body 13. The cab 14 can be integrally formed on the cab riser 15, that is, the cab 14 can be a part of the cab riser 15. In the cab 14, an operator's seat, an operation lever, and the like can be installed. The cab 14 and the cab riser 15 can be formed integrally and tiltably coupled to the main body 13 (e.g., the machine body). In other instances, the cab 14 and the cab riser 15 may be separately fabricated and/or separably coupled. Alternatively, the cab 14 and the cab riser 15 may be regarded as two sections of one element, such as a prefabricated element and/or inseparable element.

In FIGS. 1-2, a door to the cab 14 can be provided in a rear side of the cab 14 so that the operator can gain access inside the cab 14. Also, the cab 14 may include one or more viewports 31 (e.g., a window, opening, etc.) that allow an operator positioned within the cab 14 to view outside.

Furthermore, a boom for work can be mounted on the other side of the front part of the main body 13. An engine and a power device such as a hydraulic pump which is driven by the engine can be mounted on the rear part of the main body 13.

Figure 3:
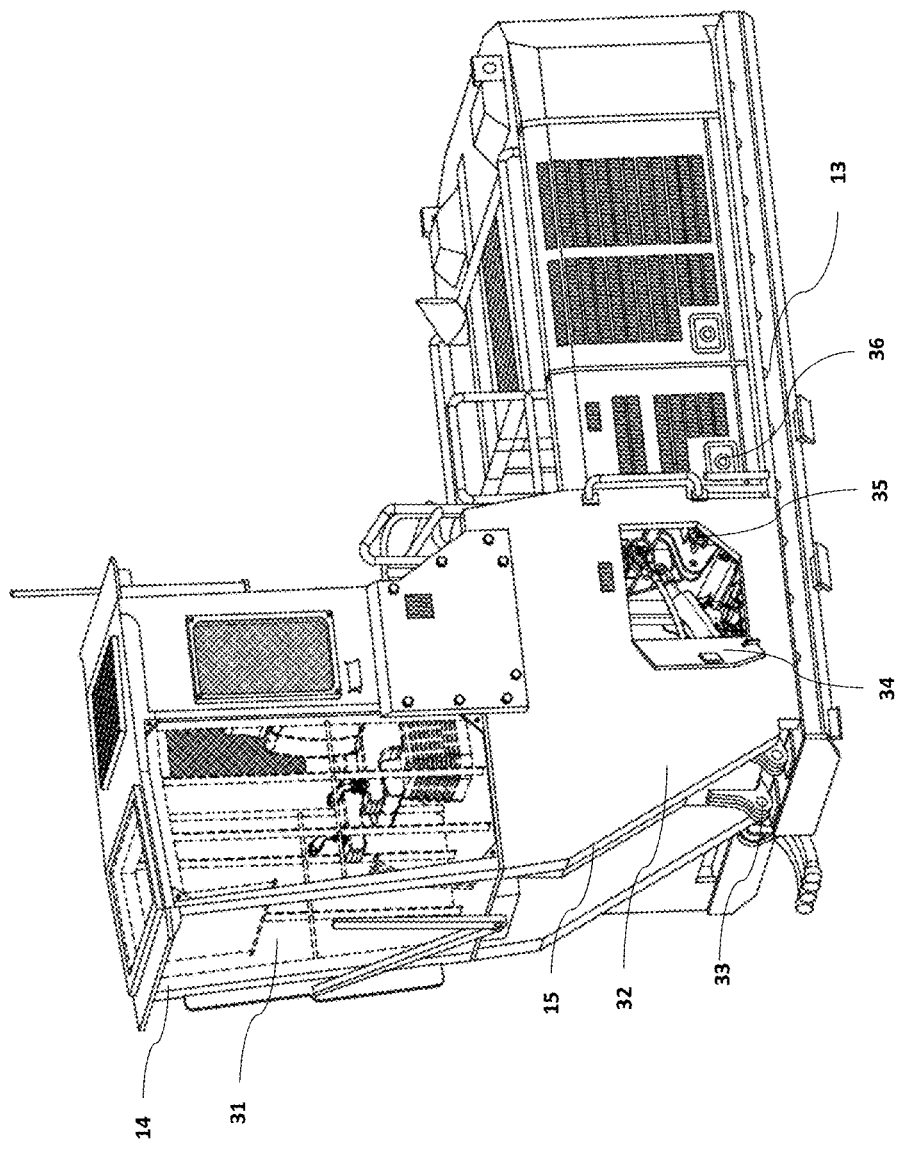
FIG. 3 is a perspective view a cab and a cab riser of the work machine of FIG. 1 in an operation position.
Figure 4:
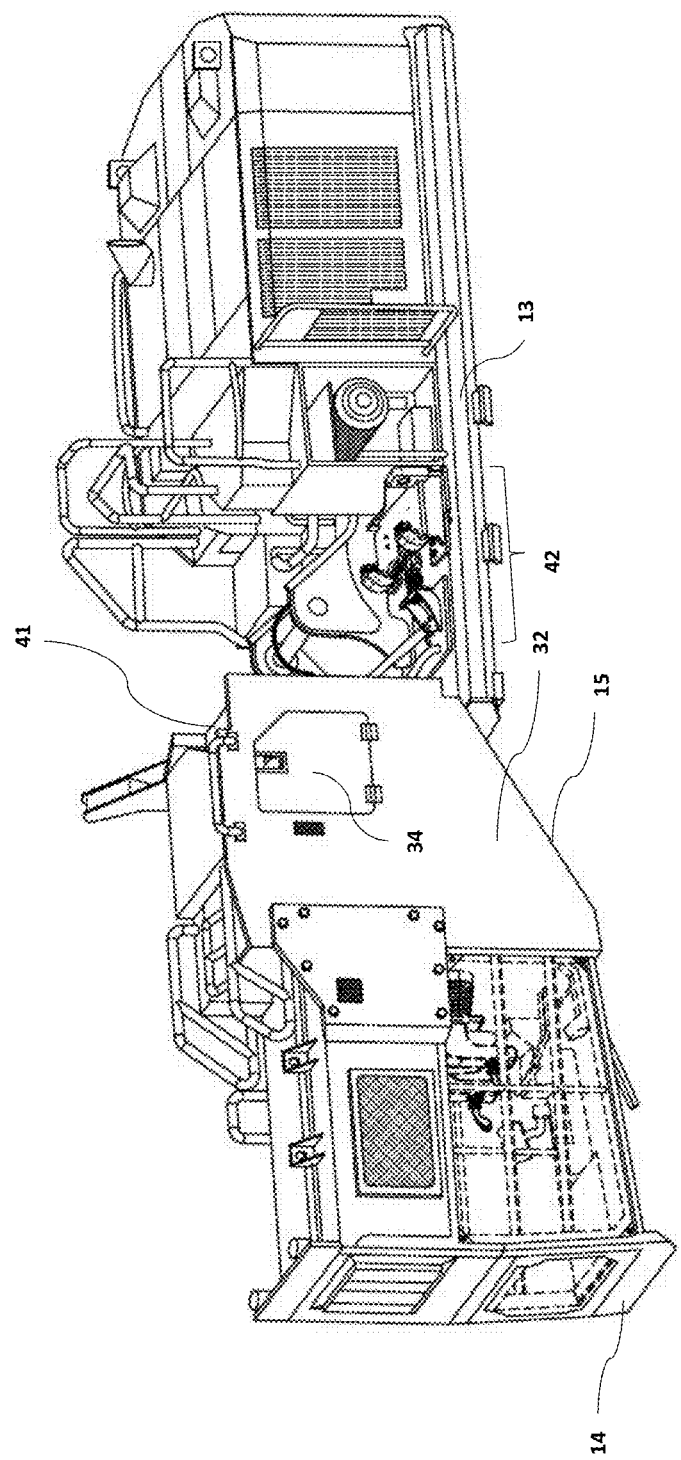
FIG. 4 is a perspective view a cab and a cab riser of the work machine of FIG. 1 in a transportation position.

Turning now to FIGS. 3-4, FIG. 3 is a perspective view of the cab 14 and the cab riser 15 of the work machine 1 of FIG. 1 and FIG. 2 in an operation position, and FIG. 4 is a perspective view the cab 14 and the cab riser 15 of the work machine 1 of FIG. 1 and FIG. 2 in a transportation position. The operation position and the transportation position may be referred to herein as a first position and a second position, respectively. The cab 14 and the cab riser 15 may be tiltably coupled with the main body 13 such that the cab 14 and the cab riser 15 can tilt about a shaft 33 (e.g., which may be or include a pair of shafts) from the illustrated upright position (i.e., the operation position) as shown in FIG. 3 to the tilt position (i.e., the transportation position) as shown in FIG. 4. The shaft 33 can be provided on the front end of the main body 13, which rotatably connects the cab riser 15 to a main body 13. The cab riser 15 can rotate about the shaft 33 in a clockwise direction and a counterclockwise direction to and from the operation position and the transportation position. An actuator to tilt (e.g., a cylinder, a ball screw, any electric or hydraulic actuators, etc.) can be provided on the main body 13 where the bottom of the cab riser 15 contacts. The base of the actuator can be positioned on the main body 13, and the end of the actuator can be positioned toward a rear direction of the cab riser 15. When the actuator expands, the cab riser 15 can be tilted forward around the shaft 33, such as shown in FIG. 4, and when the actuator contracts, the cab riser 15 can be tilted to stand upright, such as shown in FIG. 3. A switch 36 to control the actuator to tilt the cab riser 15 can be provided at a side of a component which can be mounted on the main body 13 as a part of the main body 13, for instance.

Referring to FIG. 4, a cavity 41 may be located on a rear face of the cab riser 15. The cavity 41 may be adapted to be coupled with a clamping assembly 42 of the work machine 1. Further, the cavity 41 may be adapted to house a frame that is used to fasten the cab 14 and the cab riser 15 to the main body 13 of the work machine 1.

According to one or more embodiments of the disclosed subject matter, the clamping assembly 42 can be provided on the main body 13 of the work machine 1. The clamping assembly 42 may include a base structure, a clamping structure, and an actuator to move the clamping structure linearly in a forward running direction of the work machine 1. Such movement may be according to a first linear direction (e.g., opposite the forward running direction) for clamping and in a second direction opposite the first direction (e.g., forward running direction) for unclamping.

As shown in FIGS. 3-4, the cab riser 15 may include an access door 34 located on a side face 32 of the cab riser 15. According to embodiments, an operator of the work machine 1, which may not necessarily be the same person who accesses the cab 14, can open the access door 34 to access switches inside of a housing of the cab riser 15 through the access door 34. A switch 35 to activate the clamping assembly 42 can be disposed adjacent to the clamping assembly 42 where the operator can operate through the access door 34. The detail mechanism of the clamping assembly 42 will be described below.

Figure 5:
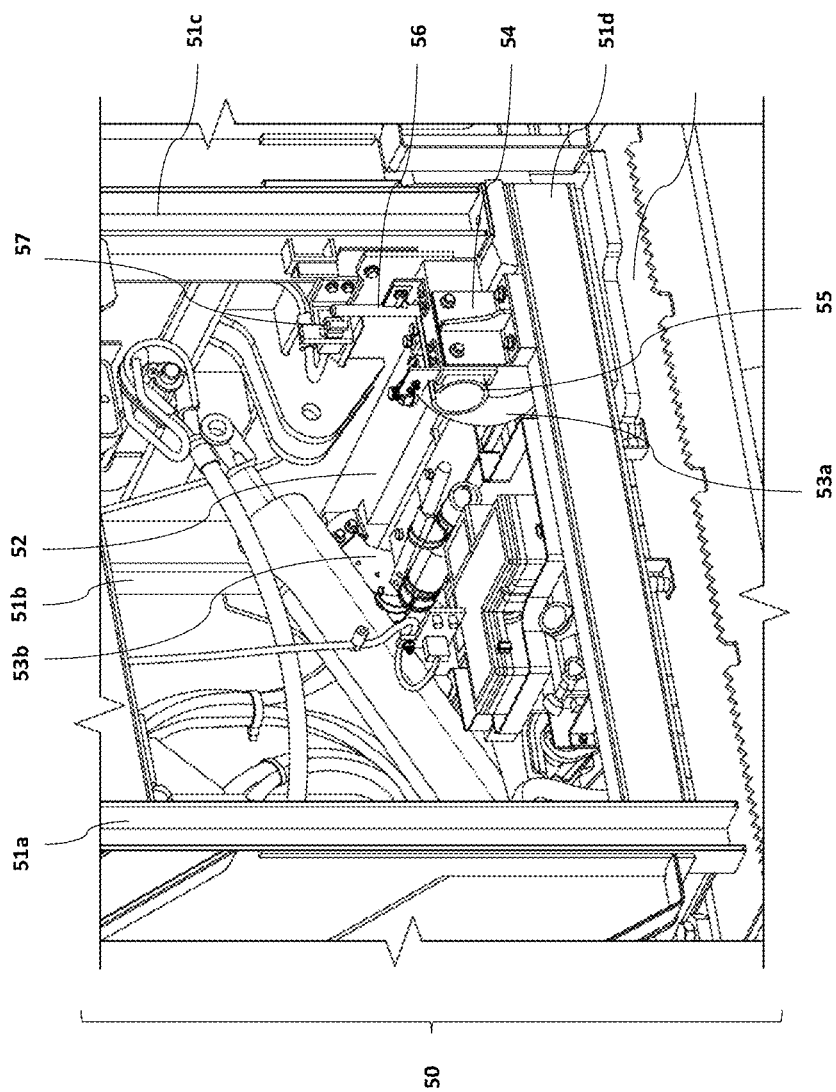
FIG. 5 is a perspective view of inside the cab riser in the operation position as shown in FIG. 3.

Turning now to FIG. 5, FIG. 5 shows a perspective view of inside the cab riser 15 in the operation position as shown in FIG. 3. In FIG. 5, one side portion of the housing of the cab riser 15 is removed for explanation of the inside.

According to one or more embodiments, the cab riser 15 may comprise supporting members 51a to 51c, each of which may be a columnar member extending vertically in the operation position, as a frame 50 to support the cab 14. A supporting member 51d may be connected to the supporting member 51a at one end as part of the frame and extend horizontally along the forward running direction, in the operation position. Similarly, another lateral supporting member may be connected to another columnar supporting member at one end as part of the frame and extend horizontally along the forward running direction in parallel to the supporting member 51*d*, in the operation position.

A plate 52, which may be flat, may be arranged to bridge a gap between the supporting member 51*d* and the other lateral supporting member which is mounted in parallel to the supporting member 51*d*, along an orthogonal direction to the running direction. At one edge of the plate 52, a lower surface of the plate 52 may contact a top surface of the supporting member 51*d*, and the lower surface of the plate 52 may be fastened to the supporting member 51*d*. The other edge of the plate 52 may contact a top surface of the other lateral supporting member, and the other edge of the plate 52 may be fastened to the other lateral supporting member. The plate 52 may be referred to herein as a first plate.

In one embodiment, the supporting member 51*c* may be mounted on an upper surface of the plate 52 and a bottom surface of the supporting member 51*c* may contact the upper surface of the plate 52 at one end. Similarly, the other columnar supporting member may be mounted on an upper surface of the plate 52 and a bottom surface of the other columnar supporting member may contact the upper surface of the plate 52 at one end. The plate 52 and the supporting member 51*c* or the other columnar supporting member may be fastened by a fastening member (e.g., a bolt with a nut and a washer, a screw, etc.).

It is noted that embodiments of the disclosed subject matter are not limited to the specific arrangement of the plate 52 as shown in FIG. 5. For instance, embodiments of the disclosed subject matter can arrange the plate 52 in different positions as a part of the frame of the cab riser 15 of the work machine 1.

As shown in FIG. 5, clamps 53*a* and 53*b*, each of which may be C-shaped, may be arranged adjacent to the plate 52. The clamps 53*a* and 53*b* can be arranged at opposite edge portions of the plate 52 in a longitudinal direction of the plate 52. The detail of the clamps 53*a* and 53*b* will be described with reference to FIGS. 6-7. Though FIG. 5 shows two clamps 53*a* and 53*b*, embodiments of the disclosed subject matter are not so limited and may include only one clamp, for instance.

As shown in FIG. 5, a base member 54 may be mounted on the supporting member 51*d* adjacent to the plate 52 and fastened to the supporting member 51*d* by a fastening member (e.g., a bolt with a nut and a washer, a screw, etc.) at one end. At the other end of the base member 54, a cylindrical member 55 can be connected to the base member 54 so that the cylindrical member 55 can extend along the forward running direction of the work machine 1. The inside of the cylindrical member 55 can be hollow to receive a locking member, such as a slide bolt with a handle 56 extending, for instance, upward, from a body of the locking member. More specifically, the locking member can penetrate a through hole (e.g., a slot or a slit) which can be arranged on the clamping assembly 42, by sliding the handle 56 manually in a direction opposite the forward running direction of the work machine 1. In the embodiment, the cylindrical member 55 and the locking member can be used for locking or otherwise retaining the cab riser 15 to the main body 13 of the work machine 1, in addition to the clamping structure (e.g., clamps 53*a* and 53*b*), when the cab riser 15 is in the first position. Such additional locking or retention of the cab riser 15 relative to the main body 13 of the work machine 1 can be to make decoupling of the cab riser 15 even more unlikely, which can improve safety. The detail of the cylindrical member 55 and the locking member will be described in more detail with respect to FIG. 8.

As shown in FIG. 5, a switch 57 to activate an electric actuator, which can be connected to the clamps 53*a* and 53*b*, can be arranged as a part of the frame of the cab riser 15, adjacent to the access door 34 as shown in FIG. 3, for instance, so that the operator can operate the switch 57 through the access door 34.

Figure 6:
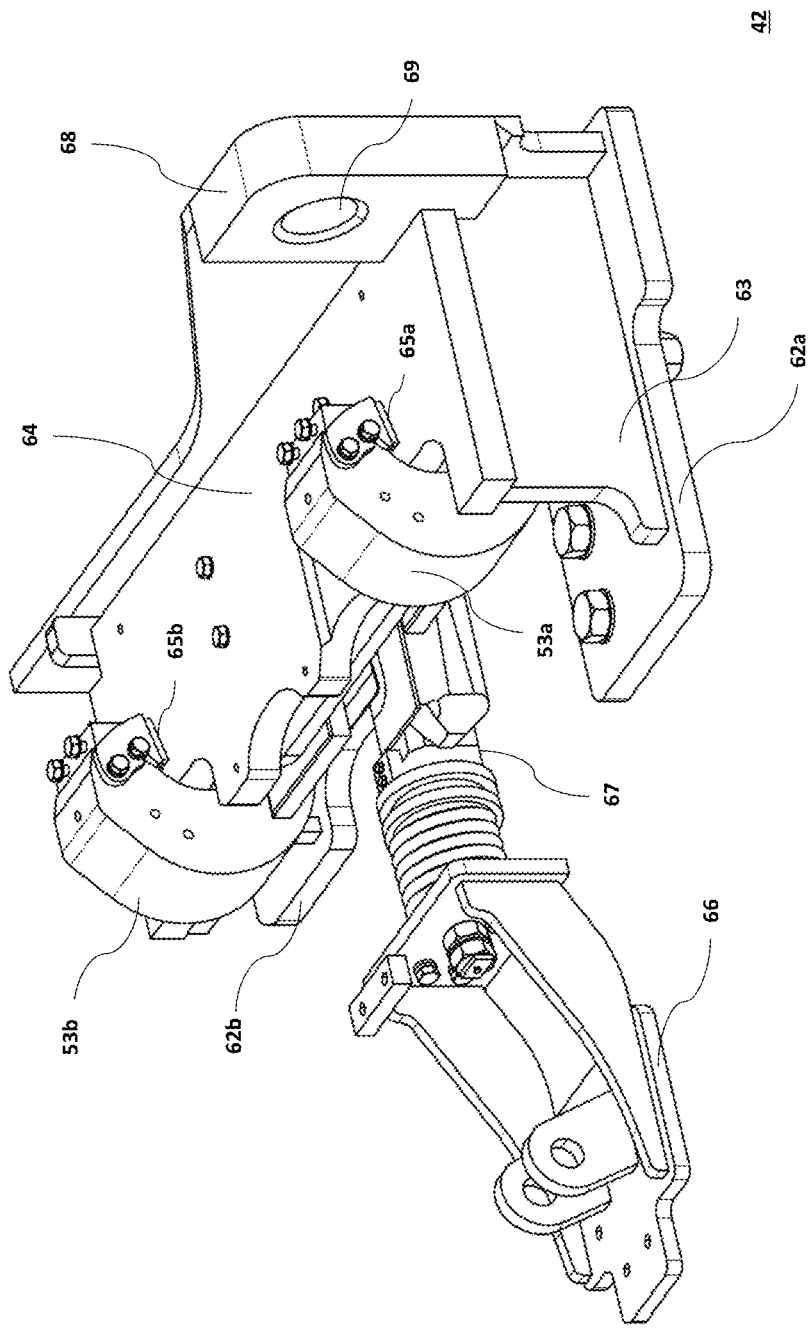
FIG. 6 is a perspective view of a clamping assembly of a work machine according to embodiments of the disclosed subject matter.
Figure 7A:
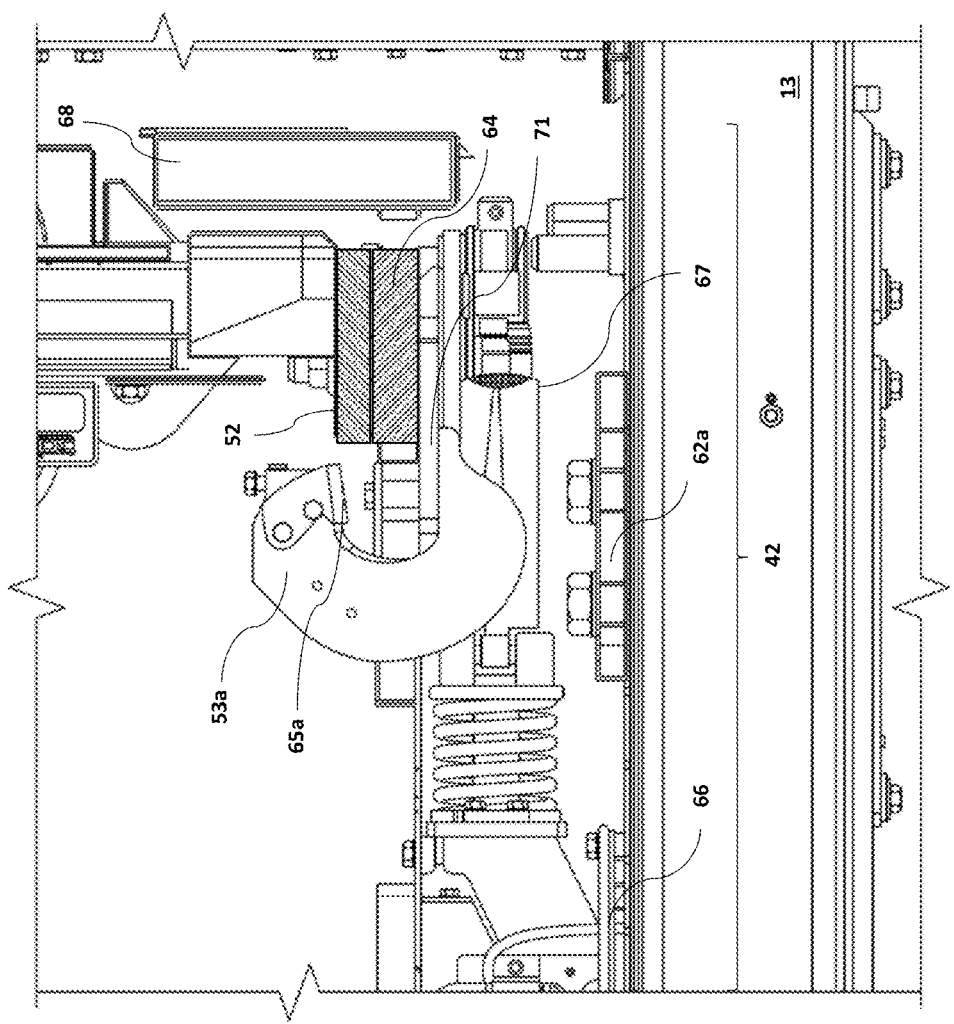
FIGS. 7A and 7B show a side view of the clamping assembly of the work machine in different operational states according to embodiments of the disclosed subject matter.
Figure 7B:
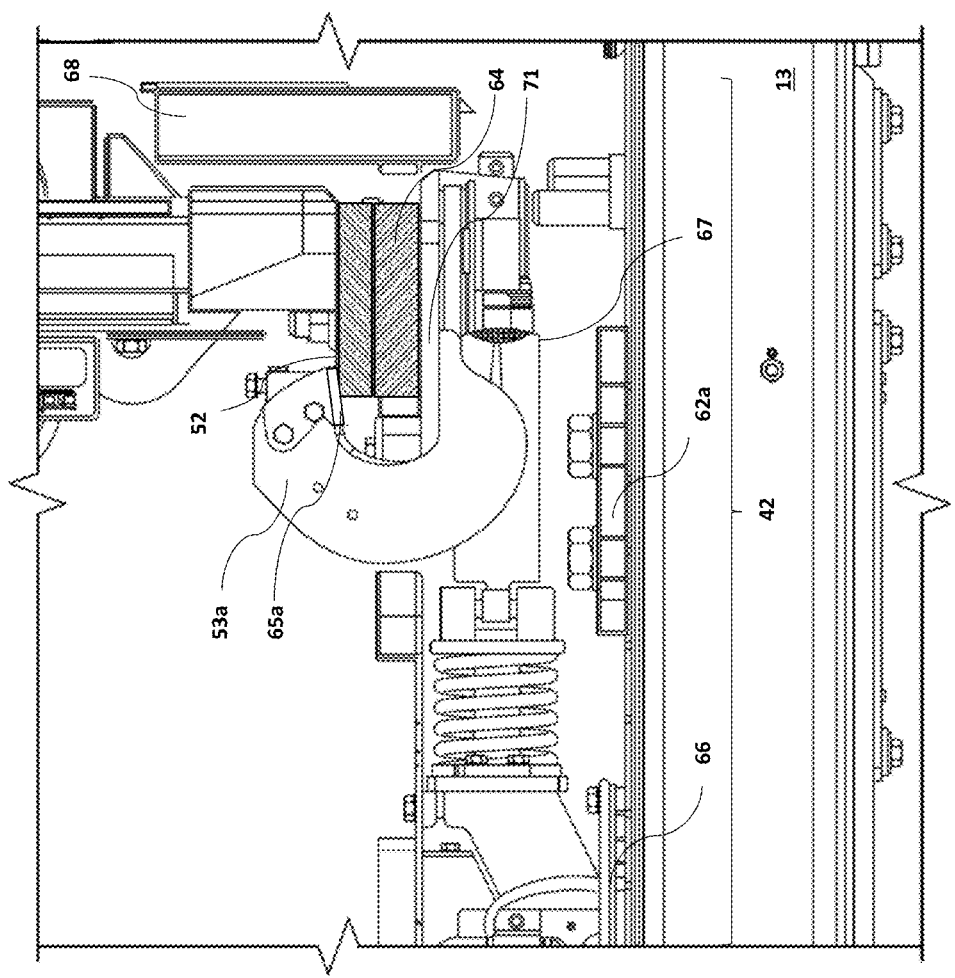

Turning now to FIGS. 6, 7A, and 7B, FIG. 6 shows a perspective view of a clamping assembly 42 of a work machine according to embodiments of the disclosed subject matter, and FIGS. 7A and 7B show a side view of the clamping assembly 42 of the work machine 1 in different operational states according to embodiments of the disclosed subject matter, particularly where FIG. 7A shows an unclamped operational state of the clamping assembly 42 and FIG. 7B shows a clamped operational state of the clamping assembly 42.

As shown in FIG. 6, the clamping assembly 42 can include base members 62*a* and 62*b*, a support member 63, a plate 64, which may be flat, the clamps 53*a* and 53*b*, a base member 66, an electrical actuator 67, and a connecting member 68. In the embodiment, the base member 62*a* and the base member 66 can be mounted on the main body 13 by a fastening member (e.g., a bolt with a nut and a washer, a screw, etc.).

According to one or more embodiments, the support member 63 can be mounted on the base member 62*a* vertically to support the plate 64 and the connecting member 68. The plate 64 can be connected to the support member 63 at one end and to other support member which is mounted on the base member 62*b* at the other end. As shown in FIG. 6, the plate 64 can be shaped to have recesses on one edge in the lateral direction, to receive the clamps 53*a* and 53*b*. The plate 64 may be referred to herein as a second plate.

Each of the clamps 53*a* and 53*b*, again, which can have a C-shape in a side elevational view, can have a bottom contact surface 65*a* and 65*b*, respectively. The bottom contact surface 65*a* can be angled to contact an upper surface of the plate 52 (i.e., first plate) of the cab riser 15. Similarly, the bottom contact surface 65*b* can be angled to contact the upper surface of the plate 52 (i.e., first plate) of the cab riser 15.

In the embodiment, the clamps 53*a* and 53*b* can be connected to the electric actuator 67, which can provide the clamps 53*a* and 53*b* with movement in the forward running direction of the work machine 1 and in an opposite direction. For example, the electric actuator 67 can move the clamps 53*a* and 53*b* opposite the forward running direction to engage the upper surface of the plate 52 of the cab riser 15, when the cab riser 15 is in the first or operating position. On the other hand, the electric actuator 67 can move the clamps 53*a* and 53*b* in the opposite direction, i.e., in the forward running direction, to disengage the upper surface of the plate 52 of the cab riser 15, for instance, so the cab riser 15 can be operated to move to the second or transportation position.

As shown in FIG. 6, the electric actuator 67 can be connected to the base member 66 at the other end. Additionally, the electric actuator 67 can provide a predetermined force to push the clamps 53*a* and 53*b* in the opposite direction to the forward running direction during in an engaged state by the clamps 53*a* and 53*b*.

It is noted that embodiments of the disclosed subject matter are not limited to the electric actuator 67 as shown in FIG. 5 and FIG. 6. For instance, embodiments of the disclosed subject matter can adopt a hydraulic actuator instead of the electric actuator to move the clamps 53a and 53b.

Also, it is noted that embodiments of the disclosed subject matter are not limited to the number of the clamps 53a and 53b as two as shown in FIG. 6. For instance, embodiments of the disclosed subject matter can adopt one clamp or three or more clamps to clamp the plate 52 and the plate 64 together. Optionally or alternatively, the one or more clamps can be arranged at any points around the plate 52 and the plate 64 in a top plan view.

Here, in FIG. 6, the connecting member 68 can be mounted on the support member 63 and the plate 64. As noted above, the connecting member 68 can comprise a through hole 69, for instance, at a center thereof to receive the locking member from the cab riser 15. The diameter of the through hole 69 may match the diameter of the cylindrical member 55.

Referring now to FIGS. 7A and 7B, FIG. 7A shows a disengaged state of the clamp 53a and the plate 52 of the cab riser 15, and FIG. 7B shows an engaged state of the clamp 53a and the plate 52 of the cab riser 15. As shown in FIGS. 7A and 7B, one end of the clamp 53a can have the bottom contact surface 65a, which may be angled by a predetermined angle, and the other end of the clamp 53a can be connected to a plate 71, which may be flat. The plate 71 may be referred to as a third plate hereinafter. When the electric actuator 67 moves the clamp 53a in the forward running direction and the opposite direction (e.g., left and right directions in FIG. 7A, respectively), the plate 71 can move together with the clamp 53a (and the clamp 53b on the other side). More specifically, the plate 71 can slidably move under the plate 64 under control of the electric actuator 67.

As shown in FIG. 7B, the clamp 53a can pinch the upper surface of the plate 52 and the lower surface of the plate 64 with the end of the clamp 53a and the plate 71 in the engaged state of the clamp 53a. Accordingly, a lower surface of the plate 52 can contact an upper surface of the plate 64 in the engaged state of the clamp 53a (and the clamp 53b on the other side).

Figure 9:
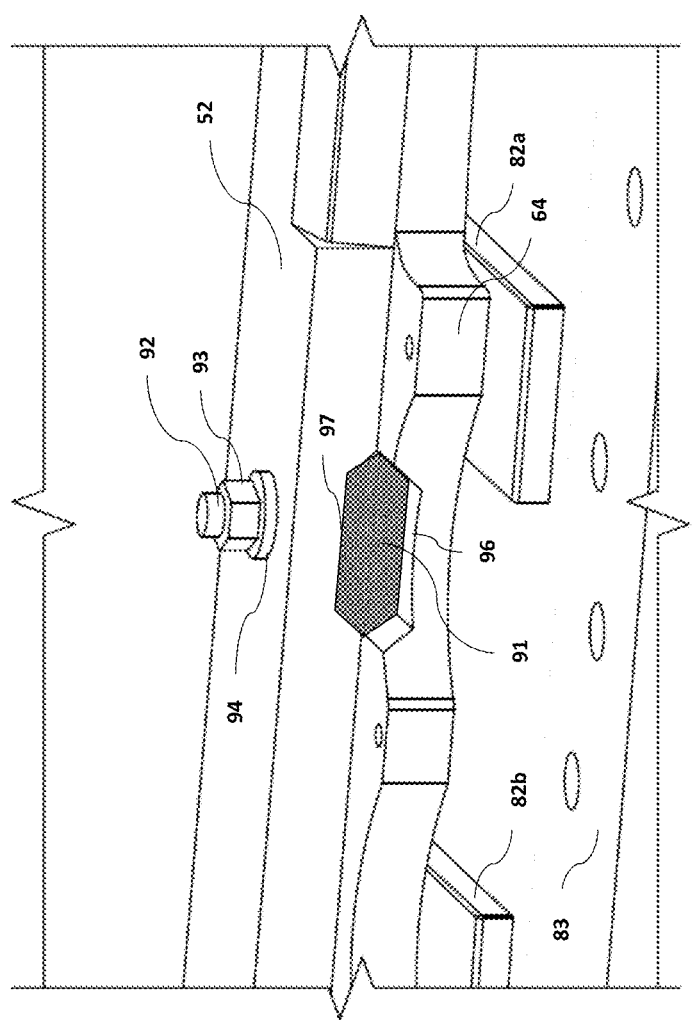
FIG. 9 is a schematic illustration of coupling a first plate and a second plate with a key plate between the first plate and the second plate according to embodiments of the disclosed subject matter.

It is noted that embodiments of the disclosed subject matter are not limited to the engaged state of the clamps 53a and 53b that the lower surface of the plate 52 directly contacts the upper surface of the plate 64 as shown in FIGS. 7A, 7B and 9. For instance, embodiments of the disclosed subject matter can adopt another plate between the lower surface of the plate 52 and the upper surface of the plate 64 in the engaged state of the clamps, so that the lower surface of the plate 52 can indirectly contact the upper surface of the plate 64 by sandwiching the other plate in the engaged state of the clamps.

Figure 8:
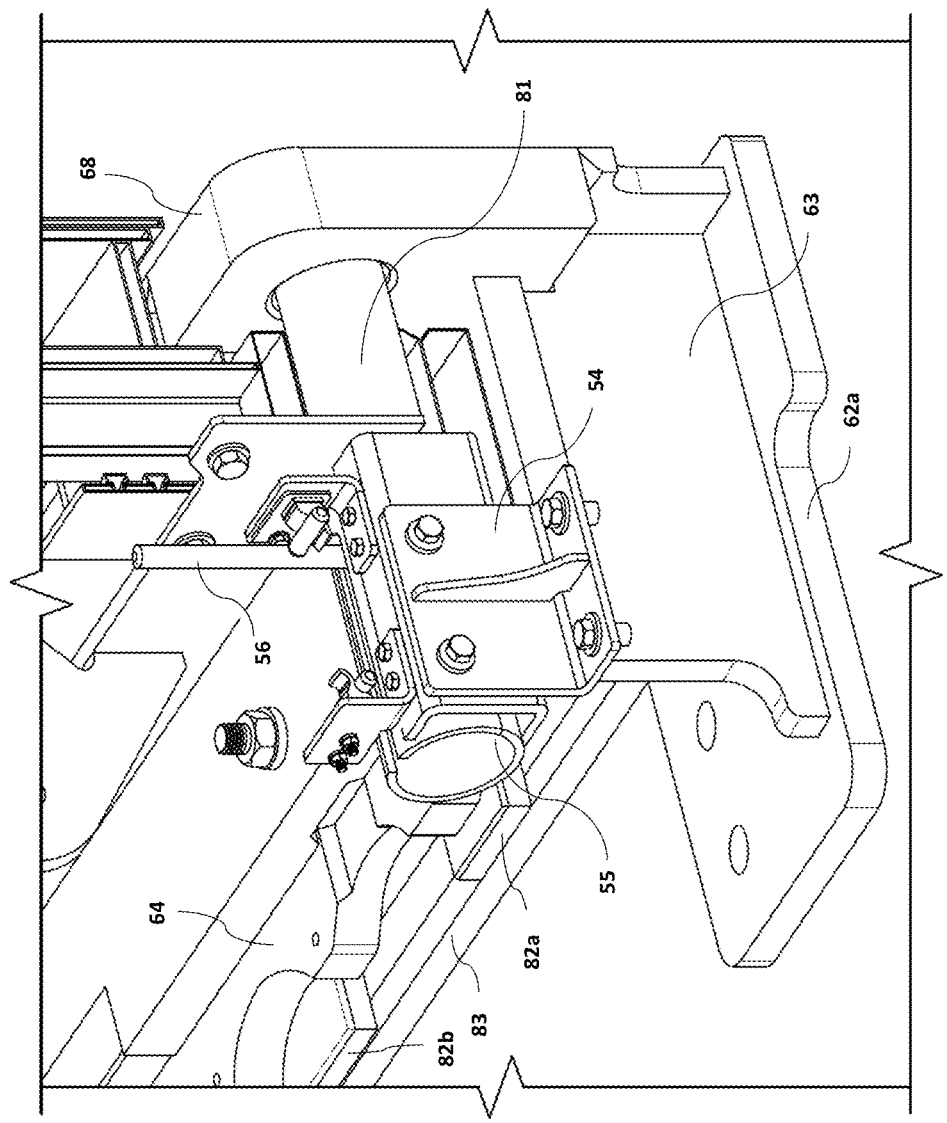
FIG. 8 is a perspective view of a locking structure of the cab riser according to embodiments of the disclosed subject matter.

Turning now to FIG. 8, FIG. 8 shows a perspective view of a locking structure of the cab riser 15 according to embodiments of the disclosed subject matter. As noted above, the through hole 69 can be provided, for instance, at a center of the connecting member 68, which can be part of the clamping assembly, to receive a locking member 81 from the cab riser 15. The locking member 81 may be formed as cylindrical shape with smaller diameter than that of the cylindrical member 55 to slidably move longitudinally in the cylindrical member 55. Additionally, the locking member 81 can be connected to the handle 56. For example, the handle 56 can be accessed through the access door 34 of the cab riser 15 to manually move the handle 56 in the opposite direction to the forward running direction to lock, so that the locking member 81 can penetrate the through hole 69 of the connecting member 68. As a result, the cab riser 15 can be connected to the main body 13 by the locking member 81, in addition to the clamping assembly 42, according one or more embodiments. Therefore, in an unlikely event that the clamps 53a and/or 53b unintentionally disengage the plate 52, or an even that the power source to the electric actuator 67 is shut down, the locking mechanism with the locking member 81 can prevent a situation where the cab 14 and the cab riser 15 undesirably disengage, for instance, tilted forward from the operation position to the transportation position. The handle 56 may engage a retention member (e.g., grasping arms) when the locking member 81 and the handle 56 are fully seated in the cylindrical member 55.

In one embodiment, the handle 56 and the locking member 81 may be moved in the forward running direction to unlock the locking member 81 and even remove the locking member 81 and the handle 56 from the cylindrical member 55.

Turning now to FIG. 9, FIG. 9 shows a schematic illustration of coupling a first plate (i.e., the plate 52) and a second plate (i.e., the plate 64) with a key plate 91 between the first plate and the second plate according to embodiments of the disclosed subject matter.

As shown in FIGS. 8-9, support members 82a and 82b and a plate 83, which may be arranged in parallel to the plate 64 vertically, may be a part of the clamping assembly 42. The plate 83 may be connected to the support member 63 at one end in the longitudinal direction and the support members 82a and 82b may be mounted on an upper surface of the plate 83.

According to one or more embodiments, the key plate 91 can be detachably or removably arranged between the plate 52 and the plate 64. More specifically, the lower surface of the plate 52 can be provided with a first recess 97 and the upper surface of the plate 64 can be provided with a second recess 96. Optionally, the key plate 91 may have a width (i.e., into the page of FIG. 9) that is different (e.g., less than) the width of the first recess 97 and/or the second recess 96. The key plate 91 can be formed to match a shape of a space created by the first recess 97 and the second recess 96 in the engaged state of the clamps 53a and 53b.

Optionally, as shown in FIG. 9, the key plate 91 can be attached to the plate 52 with a fastening member, such as a bolt 92, a nut 93, and a washer 94. The fastening member can be provided by any fastening means and is not limited to the disclosed example.

As a result, by positioning the key plate 91 between the plate 52 and the plate 64, the two plates can contact firmly without undesirable movement (e.g., rattling) in the longitudinal direction.

Figure 10:
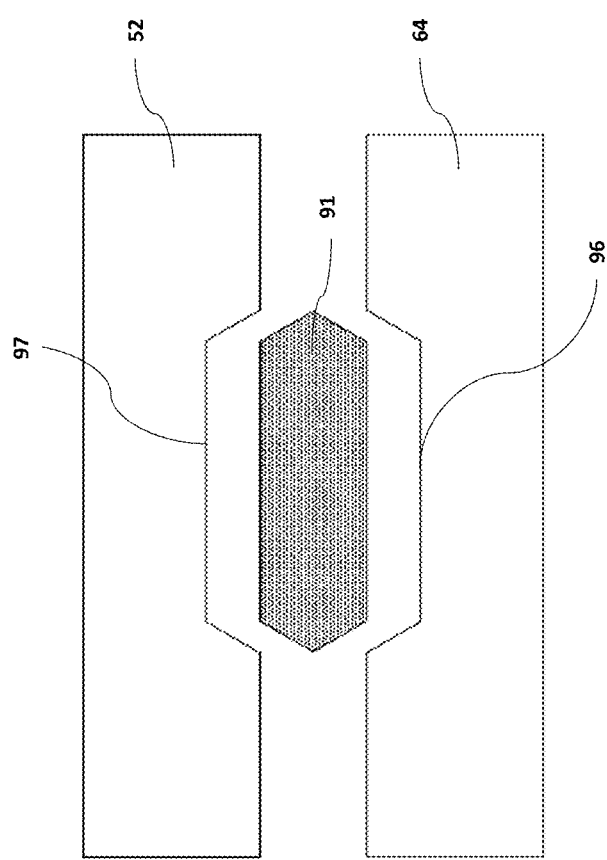
FIG. 10 shows a cross sectional view of a schematic illustration of positioning the first plate relative to the second plate with the key plate therebetween according to embodiments of the disclosed subject matter.

Turning now to FIG. 10, FIG. 10 shows a cross sectional view of the schematic illustration of positioning the first plate 52 relative to the second plate 64 with the key plate 91 therebetween according to embodiments of the disclosed subject matter.

As shown in FIG. 10, the first recess 97 and the second recess 96 can be formed by a trapezoidal shape in a cross sectional view, so that contact of each of plate 52 and the plate 64 to the key plate 91 can be guided smoothly. Therefore, the key plate 91 may be formed to match the shape of a space created by the first recess 97 and the second recess 96 in the cross sectional view, when the cab 14 is positioned in the operation position, that is, the two plates are in the engaged state by the clamps 53a and 53b.

In a case that the key plate 91 is attached to the plate 52 with the fastening member, the shape of the first recess 97 may not be the trapezoidal shape and can be an approximately rectangular parallelepiped shape, since the positioning of the key plate 91 and the plate 52 may not be necessary.

It is noted that embodiments of the disclosed subject matter are not limited to the specific shape and specific arrangement of the key plate 91 in FIGS. 9-10. For instance, embodiments of the disclosed subject matter can shape the key plate 91 in different ways or arrange the key plate 91 in different positions between the two plates 52 and 64.

Figure 11:
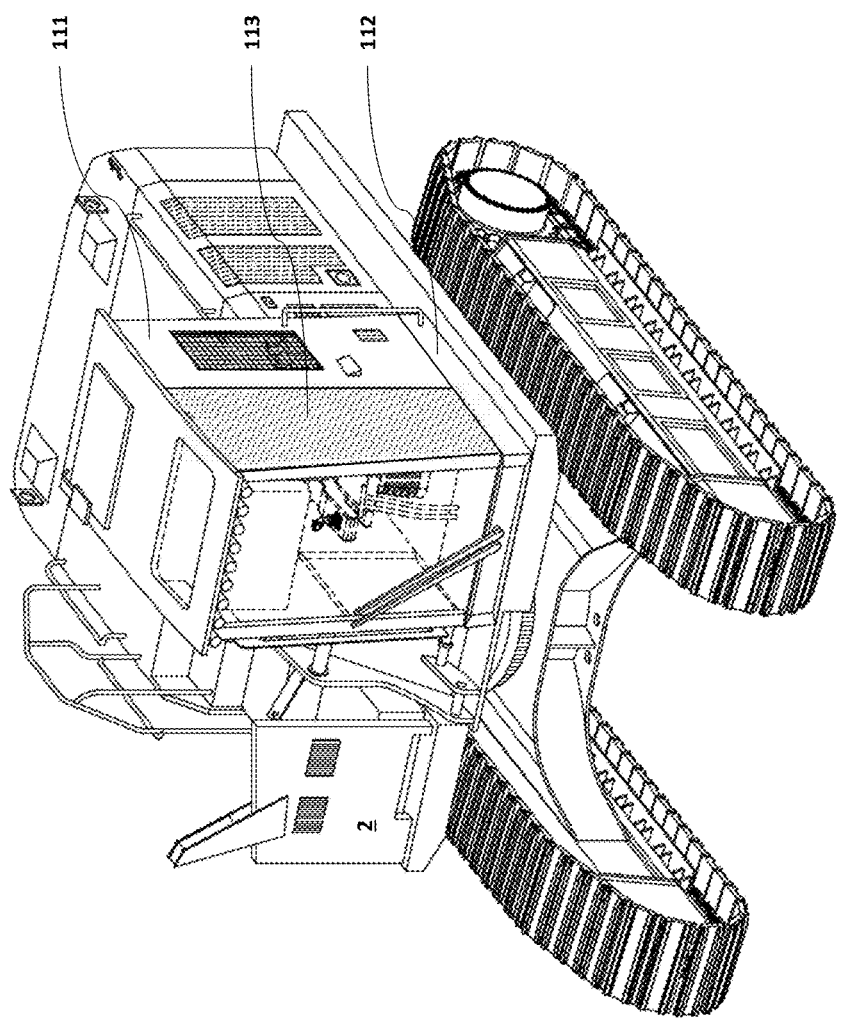
FIG. 11 is a perspective view of another forestry work machine another example of a work machine according to one or more embodiments of the disclosed subject matter.

Turning now to FIG. 11, FIG. 11 is a perspective view of another forestry work machine as example of a work machine 2 according to one or more embodiments of the disclosed subject matter. In FIG. 11, a height of a cab riser 112 and a position of a door 113 are different from those shown in FIG. 1. The operator of the work machine 2 may ride on to a cab 111 from the door 113 provided in a side direction of the cab 111. The positioning of the cab riser 112 relative to the main body, the clamping, and/or locking assemblies discussed herein can be equally applicable to the work machine 2.

It is noted that embodiments of the disclosed subject matter are not limited to the specific arrangement of the cab riser and position of a door as shown in FIG. 11. For instance, embodiments of the disclosed subject matter can arrange the cab riser and its parts in different positions of the work machine 2.

INDUSTRIAL APPLICABILITY

As noted above, the present disclosure relates to work machines, and more particularly to forestry work machines having a cab and a cab riser which is tiltably coupled to a body, and systems, assemblies, and methods thereof.

Embodiments of the disclosed subject matter can involve a work machine that can comprise a main body, a cab riser, and a shaft. The cab riser can include a cab and a frame, the cab being uprightly positioned on the work machine in a first position, and being tilted forward in a second position, and the frame comprising a first plate to contact a second plate provided on the main body in the first position. The shaft can rotatably connect the cab riser to the main body, the cab riser being rotatable about the shaft in a clockwise direction and a counterclockwise direction to and from the first position and the second position. The first plate and the second plate can be clamped together by a clamping assembly in the first position, the clamping assembly including one or more C-shaped clamps to clamp the first plate and the second, and the clamping assembly can be mounted on the main body.

Alternatively, embodiments of the disclosed subject matter can involve a work machine comprises a cab riser, a main body and a shaft. The cab riser can include a cab and a frame, the cab being uprightly positioned on the work machine in a first position, and being tilted forward in a second position, and the frame comprising a support member to support the cab in the first position and a first plate which is connected to the support member in a horizontal direction. The main body can include a clamping assembly, the clamping assembly including a second plate and a clamping structure, the second plate being mounted on the main body at a predetermined height and arranged to be in parallel with the first plate in a vertical direction when the cab is in the first position, the clamping structure being movable linearly in a first direction and a second direction opposite the first direction. The shaft can rotatably connect the cab riser to the main body, the cab riser being rotatable about the shaft in a clockwise direction and a counterclockwise direction to and from the first position and the second position. The first plate of the cab riser and the second plate of the main body can be clamped together by the clamping structure in a case where the cab is in the first position, by directly engaging a lower surface of the first plate with an upper surface of the second plate or indirectly engaging the lower surface of the first plate with the upper surface of the second plate by sandwiching another plate between the first plate and the second plate.

Furthermore, an electric actuator can be provided to move the C-shaped clamps in a forward running direction and opposite direction linearly in unison. The electric actuator can move the C-shaped clamps in unison, linearly in the opposite direction to engage an upper surface of the first plate and clamp the first plate to the second plate in the first position, and in the forward running direction to disengage the upper surface of the first plate.

Additionally, a switch to operate the electric actuator to move the C-shaped clamps in the forward running direction and the opposite direction can be provided. The switch can be located adjacent to the clamping assembly and accessible from an access door, in which the access door can be adopted to a housing of the cab riser at a side portion.

Furthermore, the electric actuator can provide a predetermined pushing force to the C-shaped clamps in the first direction during in an engaged state by the C-shaped clamps.

Additionally, each of the C-shaped clamps can include a first end and a second end, in which each first end can be formed with a bottom contact surface to contact the upper surface of the first plate, respectively. In addition to that, a third plate can be integrally attached to each of the second end integrally to support the C-shaped clamps, the third plate being formed with a top contact surface to slidably contact a lower surface of the second plate. In that case, each of the C-shaped clamps can pinch the upper surface of the first plate and the lower surface of the second plate with the first ends of the C-shaped clamp and the third plate. Optionally, the bottom contact surface of each of the C-shaped clamps can be angled with respect to the upper surface of the first plate in a horizontal direction.

Furthermore, an additional lock mechanism can be provided by penetrating a locking member from the cab riser to the main body. The cab riser can include a base member disposed on a side portion of the frame and a cylindrical member connected to the base member, the base member being adjacent to the clamping assembly in the first position and the cylindrical member. The locking member can be movably mounted through the cylindrical member so that the locking member is able to penetrate a through hole arranged on the main body along the cylindrical member, to lock the cab riser to the main body in the first position.

Also, a key plate can be provided to lock the first plate and the second plate firmly. In the embodiment, the lower surface of the first plate can be provided with a first recess, the upper surface of the second plate can be provided with a second recess, the second recess being aligned with the first recess vertically in the first position. Here, at least one of the first recess and the second recess can form a trapezoidal recess in a cross sectional view of the first plate and the second plate. Then, the key plate, which can match a shape of a space created by the first recess and the second recess when the cab is in the first position, can be provided in the first recess and the second recess when the cab is in the first position. More specifically, a first hole can be arranged at a center of the key plate, a second hole can be arranged on the first plate, the second hole being aligned with the first hole in a top view of the work machine, and a third hole can be arranged on the second plate, the third hole being aligned with the first hole and the second hole in the top view.

Optionally, the key plate can be engaged by a fastening member when provided in the first recess and the second recess, and the fastening member can include a bolt, a nut, and a washer. Then, the bolt can extend through the first hole, the second hole, and the third hole, and the key plate, and can be fixed with the nut and the washer to fasten the first plate, the second plate, and the key plate.

Optionally, the key plate can be removably attached to the first plate, and the first recess can be formed by a rectangular parallelepiped shape in a cross sectional view.

Thus, embodiments of the disclosed subject matter can fasten the cab riser to the main body of the work machine without separate special tools during the transition of the work machine from the transportation position to the operation position, which may increase work efficiency.

According to the embodiments, it can be possible to fasten the cab and the cab riser to the body of the work machine without using a separate special tool. Therefore, such arrangements can increase work efficiency of the work machine (e.g., more quickly and reliably transition to the travel state or the operation state). Specifically, according to the embodiment, by clamping a plate of the cab riser and a plate of the body of the work machine with a clamping structure according to embodiments of the disclosed subject matter and adding force to the clamping structure, the cab riser and the cab can be reliably and firmly fastened to the body of the work machine. Additionally, according to the embodiment, by locking the cab riser and the main body with a rocking member, it can increase safety of the work machine in failure situation. Furthermore, according to the embodiment, by sandwiching a key plate between the plates, it can prevent or minimize undesirable movement (e.g., rattling) of the cab riser and the cab in the left-right direction. Accordingly, the safety of the cab in the operation position can be increased.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A work machine comprising:
a main body;
a cab riser including a cab and a frame, the cab being uprightly positioned on the work machine in a first position, and being tilted forward in a second position, and the frame comprising a first plate to contact a second plate provided on the main body in the first position; and
a shaft that rotatably connects the cab riser to the main body, the cab riser being rotatable about the shaft in a clockwise direction and a counterclockwise direction to and from the first position and the second position,
wherein the first plate and the second plate are clamped together by a clamping assembly in the first position, the clamping assembly including one or more C-shaped clamps to clamp the first plate and the second plate, and
wherein the clamping assembly is mounted on the main body.

2. The work machine according to claim 1,
wherein the clamping assembly comprises an electric actuator,
wherein the second plate is part of the clamping assembly, and
wherein the one or more C-shaped clamps are movable by the electric actuator, in unison, linearly in a first direction to engage an upper surface of the first plate and clamp the first plate to the second plate in the first position, and in a second direction opposite the first direction to disengage the upper surface of the first plate.

3. The work machine according to claim 2,
wherein the clamping assembly includes two C-shaped clamps which clamp the first plate and the second plate at opposite edge portions of the first plate and the second plate in a longitudinal direction of the first plate and the second plate when the cab is in the first position,
wherein each of the C-shaped clamps includes a first end and a second end, wherein each of the first ends is formed with a bottom contact surface to contact the upper surface of the first plate,
wherein a third plate is integrally attached to each of the second ends to support the C-shaped clamps, the third plate being formed with a top contact surface to slidably contact a lower surface of the second plate,
wherein each of the C-shaped clamps pinches the upper surface of the first plate and the lower surface of the second plate with the first ends of the C-shaped clamp and the third plate, and
wherein a lower surface of the first plate contacts an upper surface of the second plate in an engaged state of the C-shaped clamps.

4. The work machine according to claim 3,
wherein the bottom contact surface of each of the C-shaped clamps is angled with respect to the upper surface of the first plate in a horizontal direction.

5. The work machine according to claim 3,
wherein the lower surface of the first plate is provided with a first recess,
wherein the upper surface of the second plate is provided with a second recess, the second recess being aligned with the first recess vertically when the cab is in the first position,
wherein at least one of the first recess and the second recess forms a trapezoidal recess in a cross sectional view of the first plate and the second plate, and
wherein a key plate, which matches a shape of a space created by the first recess and the second recess when the cab is in the first position, is provided in the first recess and the second recess when the cab is in the first position.

6. The work machine according to claim 5,
wherein the key plate is engaged by a fastening member when provided in the first recess and the second recess.

7. The work machine according to claim 6,
wherein the fastening member includes a bolt, a nut, and a washer.

8. The work machine according to claim 7,
wherein a first hole is arranged at a center of the key plate in a top plan view of the work machine,
wherein a second hole is arranged on the first plate, the second hole being aligned with the first hole in a top view of the work machine,
wherein a third hole is arranged on the second plate, the third hole being aligned with the first hole and the second hole in the top view of the work machine when the cab is in the first position, and wherein the bolt extends through the first hole, the second hole, the third hole, and the key plate and is fixed with the nut and the washer to fasten the first plate, the second plate, and the key plate.

9. The work machine according to claim 5, wherein the key plate is removably attached to the first plate, and wherein the first recess has a rectangular parallelepiped shape in a cross sectional view of the first plate and the second plate.

10. The work machine according to claim 2, wherein the cab riser includes a housing that comprises an access door at a side portion, and wherein the cab riser includes a switch to operate the electric actuator to move the one or more C-shaped clamps in the first direction and the second direction, the switch being located adjacent to the clamping assembly and accessible via the access door.

11. The work machine according to claim 2, wherein the electric actuator provides a predetermined pushing force to the one or more C-shaped clamps in the first direction during in an engaged state of the C-shaped clamps.

12. The work machine according to claim 1, wherein the cab riser includes a base member disposed on a side portion of the frame and a cylindrical member connected to the base member, the base member being adjacent to the clamping assembly when the cab is in the first position and the cylindrical member, and wherein a locking member is movably mounted through the cylindrical member so as to penetrate a through hole arranged on the main body along the cylindrical member, to lock the cab riser to the main body in the first position.

13. The work machine according to claim 1, wherein the first position of the cab is an operation position to operate the work machine at a work site, and the second position is a transportation position to transport the work machine.

14. A work machine comprising:

a cab riser including a cab and a frame, the cab being uprightly positioned on the work machine in a first position, and being tilted forward in a second position, and the frame comprising a support member to support the cab in the first position and a first plate which is connected to the support member in a horizontal direction;

a main body including a clamping assembly, the clamping assembly including a second plate and a clamping structure, the second plate being mounted on the main body at a predetermined height and arranged to be in parallel with the first plate in a vertical direction when the cab is in the first position, the clamping structure being movable only linearly in a first direction and a second direction opposite the first direction; and a shaft that rotatably connects the cab riser to the main body, the cab riser being rotatable about the shaft in a clockwise direction and a counterclockwise direction to and from the first position and the second position, wherein the first plate of the cab riser and the second plate of the main body are clamped together by the clamping structure in a case where the cab is in the first position, by directly engaging a lower surface of the first plate with an upper surface of the second plate or indirectly engaging the lower surface of the first plate with the upper surface of the second plate by sandwiching another plate between the first plate and the second plate.

15. The work machine according to claim 14, wherein the clamping assembly includes two clamps, as part of the clamping structure, to clamp the first plate and the second plate together at opposite edge portions of the first plate and the second plate in a longitudinal direction of the first plate and the second plate in the case where the cab is in the first position.

16. The work machine according to claim 15, wherein the clamping assembly comprises an electric actuator, and wherein the two clamps are C-shaped clamps and are movable by the electric actuator, in unison, linearly in the first direction to engage an upper surface of the first plate and clamp the first plate to the second plate in the first position, and in the second direction to disengage the upper surface of the first plate.

17. The work machine according to claim 16, wherein each of the C-shaped clamps includes a first end and a second end, wherein each of the first ends is formed with a bottom contact surface to contact the upper surface of the first plate, wherein a third plate is integrally attached to each of the second end to support the C-shaped clamps, the third plate being formed with a top contact surface to slidably contact a lower surface of the second plate, and wherein each of the C-shaped clamps pinches the upper surface of the first plate and the lower surface of the second plate with the first ends of the C-shaped clamp and the third plate.

18. The work machine according to claim 17, wherein the lower surface of the first plate is provided with a first recess, wherein the upper surface of the second plate is provided with a second recess, the second recess being aligned with the first recess vertically in the case where the cab is in the first position, wherein at least one of the first recess and the second recess is in the form of a trapezoidal recess in a cross sectional view of the first plate and the second plate, and wherein a key plate, which matches a shape of a space created by the first recess and the second recess in the case where the cab is in the first position, is provided in the first recess and the second recess.

19. The work machine according to claim 14, wherein the cab riser includes a base member disposed on a side portion of the frame and a cylindrical member connected to the base member, the base member being adjacent to the clamping assembly in a case where the cab is in the first position and the cylindrical member, and wherein a lock pin member is movably mounted through the cylindrical member so as to penetrate a through hole arranged on the main body along the cylindrical member, to lock the cab riser to the main body in the first position.

20. A method regarding a forestry work machine, comprising:

providing a main body;

providing a cab riser including a cab and a frame, the cab being uprightly positioned on the forestry work machine in a first position, and being tilted forward in a second position, and the frame comprising a first plate to contact a second plate provided on the main body in a case where the cab is in the first position;

providing a shaft that rotatably connects the cab riser to the main body, the cab riser being rotatable about the shaft in a clockwise direction and a counterclockwise direction to and from the first position and the second position; and clamping the first plate and the second plate together by a clamping assembly in the case where the cab is in the first position, the clamping assembly being mounted on the main body and including one or more C-shaped clamps to clamp the first plate to the second.

* * * * *